(12) United States Patent
Sun et al.

(10) Patent No.: US 12,345,630 B2
(45) Date of Patent: Jul. 1, 2025

(54) REAL-TIME SPECTRUM TESTING DEVICE FOR VOLATILE CONDENSABLE MATERIAL IN WIDE TEMPERATURE RANGE AND TESTING METHOD

(71) Applicant: SHANGHAI INSTITUTE OF TECHNICAL PHYSICS, CHINESE ACADEMY OF SCIENCES, Shanghai (CN)

(72) Inventors: Liwei Sun, Shanghai (CN); Lei Ding, Shanghai (CN); Libing Li, Shanghai (CN); Enguang Liu, Shanghai (CN); Fengli Wang, Shanghai (CN)

(73) Assignee: SHANGHAI INSTITUTE OF TECHNICAL PHYSICS, CHINESE ACADEMY OF SCIENCES, Shanghai (CN)

( * ) Notice: Subject to any disclaimer, the term of this patent is extended or adjusted under 35 U.S.C. 154(b) by 247 days.

(21) Appl. No.: 18/036,291

(22) PCT Filed: Dec. 7, 2020

(86) PCT No.: PCT/CN2020/134216
§ 371 (c)(1),
(2) Date: May 10, 2023

(87) PCT Pub. No.: WO2022/116224
PCT Pub. Date: Jun. 9, 2022

(65) Prior Publication Data
US 2024/0011899 A1    Jan. 11, 2024

(30) Foreign Application Priority Data
Dec. 3, 2020 (CN) .......................... 202011396927.3

(51) Int. Cl.
*G01N 21/35* (2014.01)
*G01N 1/42* (2006.01)
*G01N 1/44* (2006.01)

(52) U.S. Cl.
CPC ............... *G01N 21/35* (2013.01); *G01N 1/42* (2013.01); *G01N 1/44* (2013.01); *G01N 2021/3595* (2013.01)

(58) Field of Classification Search
None
See application file for complete search history.

(56) References Cited

U.S. PATENT DOCUMENTS

| | | | |
|---|---|---|---|
| 10,401,336 B2 * | 9/2019 | Spartz | G01N 30/74 |
| 2018/0180579 A1 * | 6/2018 | Spartz | G01N 21/05 |

FOREIGN PATENT DOCUMENTS

| | | | |
|---|---|---|---|
| CN | 103868765 A | | 6/2014 |
| CN | 104215598 A | | 12/2014 |

(Continued)

OTHER PUBLICATIONS

Chinese First Office Action for application No. 202011396927.3 dated Dec. 2, 2021 with English Translation.
(Continued)

*Primary Examiner* — Marcus H Taningco
(74) *Attorney, Agent, or Firm* — CARTER, DELUCA & FARRELL LLP

(57) ABSTRACT

Provided are a real-time spectrum testing device for a volatile condensable material in a wide temperature range and a spectrum testing method by using the device. The device includes a testing module, a vacuum module, a temperature control module, and a spectrometer, where the testing module includes a testing cabin (5), a replaceable standard testing lens (2), and a stage (3); two infrared perspective windows (1) are symmetrically installed on two
(Continued)

opposite side walls of the testing cabin (5); the vacuum module includes a vacuum inner cavity (8) and a vacuum system (4); the vacuum inner cavity (8) is installed in the testing cabin (5) in a thermally insulated manner and connected to the vacuum system (4); the stage (3) and the standard testing lens (2) are installed in the vacuum inner cavity (8); the temperature control module includes a refrigeration system (7) and a temperature control system (6).

10 Claims, 3 Drawing Sheets

(56) References Cited

FOREIGN PATENT DOCUMENTS

| CN | 104237057 A | | 12/2014 |
|---|---|---|---|
| CN | 104374667 A | | 2/2015 |
| CN | 106840411 A | * | 6/2017 |
| CN | 109917080 A | | 6/2019 |
| CN | 110758781 A | | 2/2020 |

OTHER PUBLICATIONS

Chinese Second Office Action for application No. 202011396927.3 dated Sep. 22, 2022 with English translation.

International Search Report for PCT/CN2020/134216 dated Aug. 26, 2021.

Qing et al., Measuring Equipment for Studying Cryodeposite of Condensable Vapour on Optical Surfaces, Vacuum & Cryogenics, dated Jan. 6, 94, pp. 63-69 with English Abstract.

* cited by examiner

REAL-TIME SPECTRUM TESTING DEVICE FOR VOLATILE CONDENSABLE MATERIAL IN WIDE TEMPERATURE RANGE AND TESTING METHOD

CROSS REFERENCE TO RELATED APPLICATION

This patent application claims the benefit and priority of Chinese Patent Application No. 202011396927.3, filed with the China National Intellectual Property Administration on Dec. 3, 2020, the disclosure of which is incorporated by reference herein in its entirety as part of the present application.

TECHNICAL FIELD

The present disclosure relates to the technical field of infrared spectrum testing, and in particular, to a real-time spectrum testing device for a volatile condensable material in a wide temperature range and a testing method.

BACKGROUND

Outer space in which an aerospace payload runs is in a vacuum environment, with a vacuum degree of $10^{-4}$ Pa in a low earth orbit to $10^{-11}$ Pa in a geosynchronous orbit, and an environment in which a payload in a farther orbit runs has a lower vacuum degree. A non-metallic material releases organic molecules in a high vacuum environment, and an environment in which a precision optical remote sensor operates is often at a low temperature or even 100 K. Molecules released at a high temperature condense at a low temperature range, which is referred to as molecular pollution. Molecular pollution released by the material in a vacuum environment is one of the main sources of space pollution. Degradation of optical properties caused by molecular pollution deposition has many consequences, mainly affecting working performance of a thermally controlled surface, an optical surface, and a solar cell. The deposition of molecular pollutants on the thermally controlled surface affects emissivity and absorptivity of the surface, and then affects operation of a satellite temperature control system, or leads to failure of some components of a satellite in a severe case. For the optical surface, molecular pollution reduces reflectivity of a reflector or transmittance of a lens, a signal intensity, and a signal-to-noise ratio, which seriously affects performance of an optical load or even causes the failure of an entire aerospace instrument.

An existing Fourier transform infrared spectrometer can only test an infrared spectrum of a normal-temperature sample, but cannot implement online condensation research. Therefore, a device is needed to obtain continuous data that is of volatile matter released by the material at different temperatures and that is at different condensation temperatures, as well as a data relationship between a volatilization time and a condensation time.

SUMMARY

An objective of the present disclosure is to provide a real-time spectrum testing device for a volatile condensable material in a wide temperature range, mainly to solve the problems existing in the prior art and implement real-time measurement of spectral characteristics that are of volatile matter released by an organic material and that are at different condensation temperatures.

To achieve the above objective, the technical solution used in the present disclosure is to provide a real-time spectrum testing device for a volatile condensable material in a wide temperature range, including a testing module, a vacuum module, a temperature control module, and an FTIR spectrometer, where the testing module includes a testing cabin, a replaceable standard testing lens, and a stage; the vacuum module includes a vacuum inner cavity and a vacuum system; the vacuum inner cavity is installed in the testing cabin in a thermally insulated manner, and is connected to the vacuum system outside the testing cabin by means of a vacuum system interface installed on a cabin wall of the testing cabin; the stage is horizontally installed in the vacuum inner cavity; and the standard testing lens is vertically installed in the vacuum inner cavity;

the temperature control module includes a refrigeration system and a temperature control system; the refrigeration system is connected to the standard testing lens by means of a refrigeration system interface installed on the cabin wall of the testing cabin; and the temperature control system is connected to the stage by means of a temperature control system interface installed on the cabin wall of the testing cabin;

the FTIR spectrometer is configured to test infrared spectral characteristics of a volatile condensable material on the standard testing lens to obtain a spectral test result; and two infrared perspective windows are further symmetrically installed on two opposite side walls of the testing cabin; a geometric center of each of the infrared perspective windows is as high as a light port of the FTIR spectrometer, and a height of the standard testing lens is adjusted, so that light passing through the two infrared perspective windows at the same time also pass through the standard testing lens.

Further, an infrared optical material used for the infrared perspective windows is zinc selenide, indium sulfide, gallium arsenide, or cadmium sulfide.

Further, the temperature control system includes a heating sheet and a temperature measuring resistor; and the temperature measuring resistor collects a temperature of the stage and feeds the temperature back to the heating sheet to adjust the temperature of the stage.

Further, a temperature adjustment range of the temperature control system is 20° C. to 200° C.

Further, the vacuum system vacuumizes the vacuum inner cavity by using a molecular pump or an ion pump.

Further, the vacuum inner cavity has a vacuum degree less than $10^{-4}$ Pa.

Further, a Stirling refrigerator or a pulse tube refrigerator is adopted as the refrigeration system.

Further, a temperature adjustment range of the refrigeration system is 20° C. to −196° C.

The present disclosure further provides a spectrum testing method by using the real-time spectrum testing device for a volatile condensable material in a wide temperature range, including the following steps:

step S101: placing a to-be-tested sample on the stage, and installing the standard testing lens;

step S102: vacuumizing the vacuum inner cavity by using the vacuum system, so that the vacuum degree in the vacuum inner cavity meets an experimental requirement;

step S103: setting a temperature of the standard testing lens at a temperature under the experimental requirement by using the refrigeration system;

step S104: setting the temperature of the stage at a temperature under the experimental requirement by using the temperature control system;

step S105: causing emitted infrared rays of the FTIR spectrometer to enter from the infrared perspective window on one side of the testing cabin, pass through the standard testing lens and the infrared perspective window on the other side, and be received by the light port of the FTIR spectrometer, so as to complete testing of spectral information of a condensate on the standard testing lens; and if a test time is less than a volatilization and condensation time corresponding to a current temperature, skipping to step S105, otherwise proceeding to step S106; and S106: completing the testing and exiting if the testing in all temperature ranges is completed, otherwise proceeding to step S103 to set a new experimental temperature for testing.

Further, the to-be-tested sample is a solid, a liquid, or a colloid; and the to-be-tested sample is directly placed on the stage when being a solid, or the to-be-tested sample is applied to the stage when being a liquid or a colloid.

In view of the above technical features, the present disclosure has the beneficial effects that continuous data that is of volatile matter released by a material at different temperatures and that is at different condensation temperatures, as well as a relationship between a volatilization time and a condensation time, can be measured, thereby providing reference data of release duration of non-metallic volatile matter, a condensation temperature, and changes of condensed matter, and further providing a basis for a precision optical system to prevent organic pollution and for formulation of effective protection measures.

In the figures: 1—Infrared perspective window, 2—Standard testing lens, 3—Stage, 4—Vacuum system, 5—Testing cabin, 6—Temperature control system, 7—Refrigeration system, 8—Vacuum inner cavity, 9—To-be-tested sample.

DETAILED DESCRIPTION OF THE EMBODIMENTS

The present disclosure will be further described below with reference to specific implementations. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present application.

Figure 1:
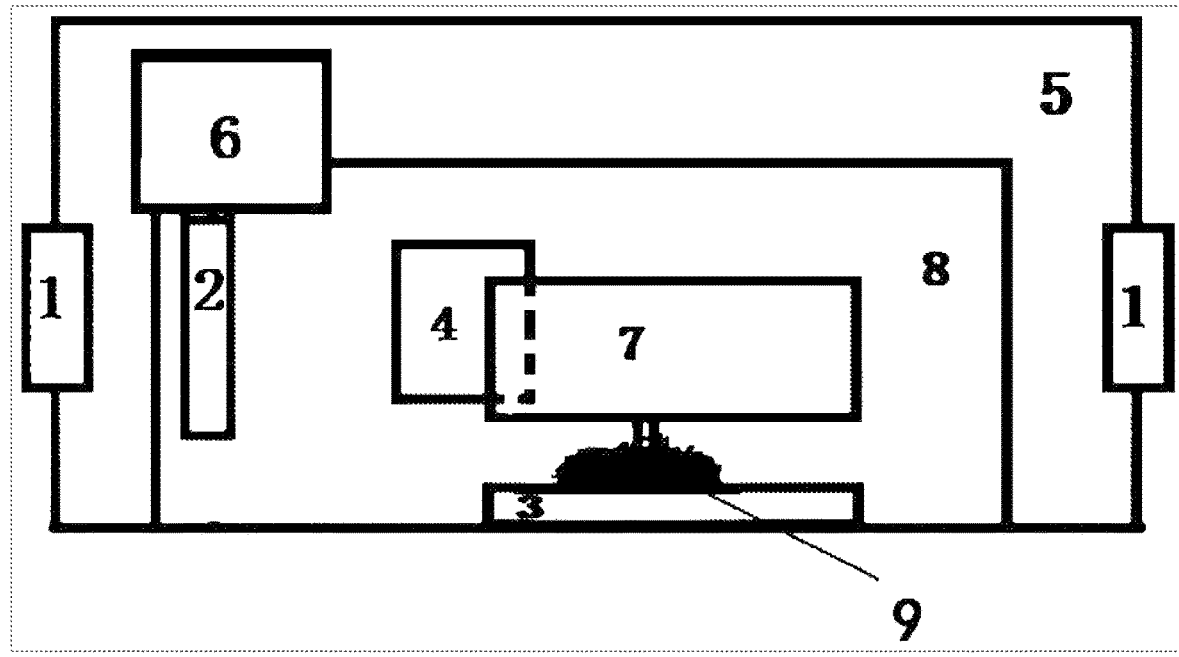
FIG. 1 is a schematic principle diagram of a preferred embodiment of a real-time spectrum testing device for a volatile condensable material in a wide temperature range according to the present disclosure.
Figure 2:
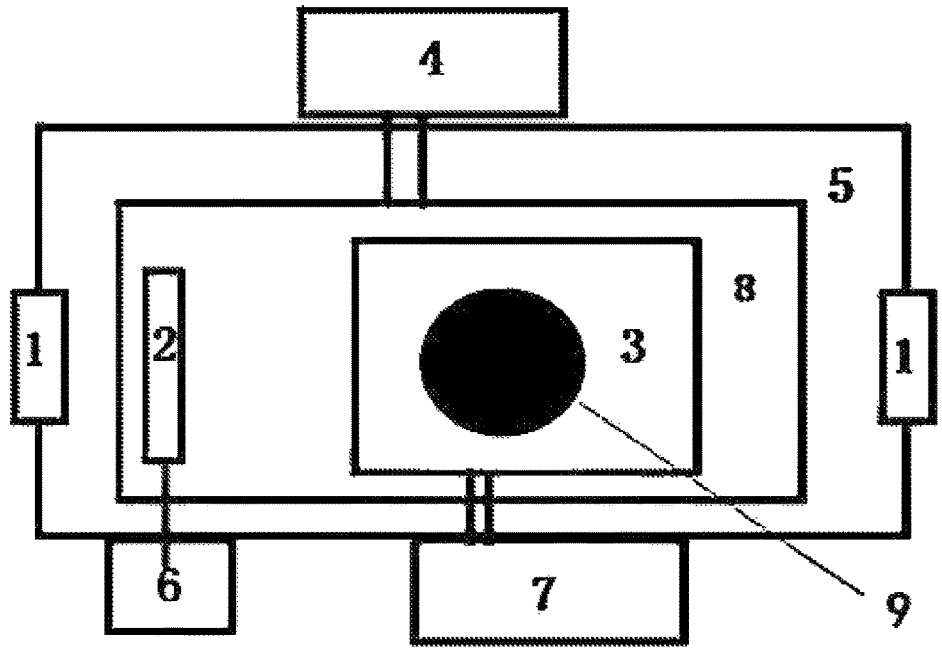
FIG. 2 is a top view of FIG. 1.
Figure 3:
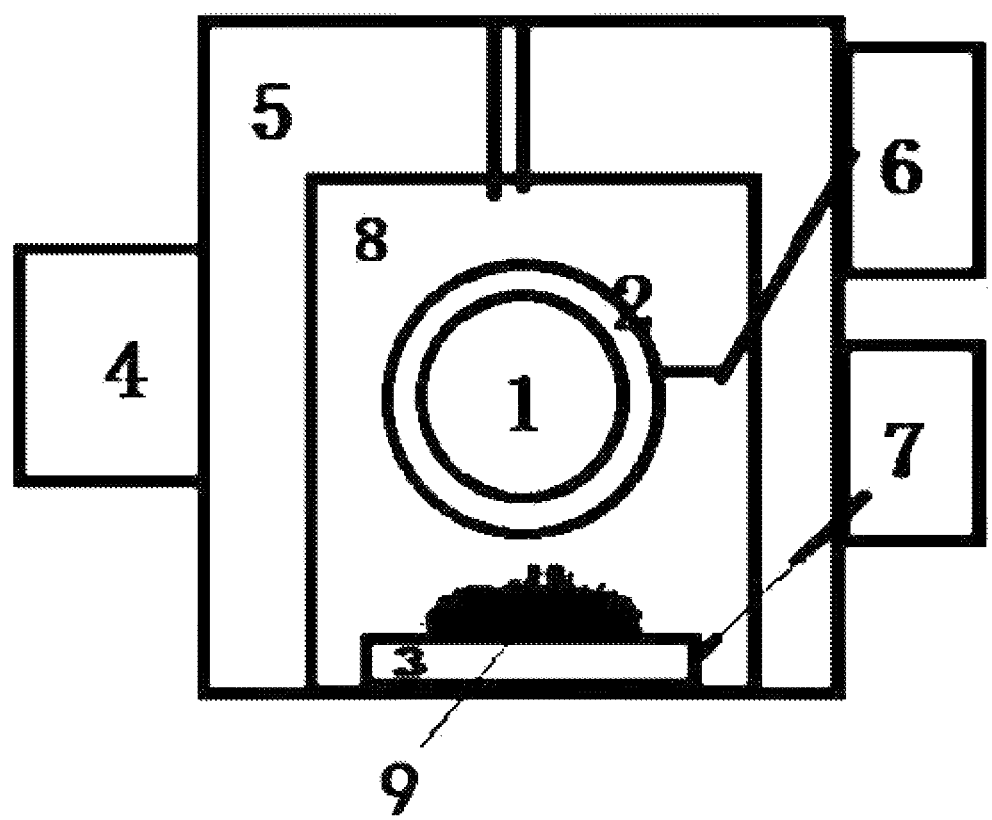
FIG. 3 is a side view of FIG. 1.

Referring to FIGS. 1, 2, and 3, a real-time spectrum testing device for a volatile condensable material in a wide temperature range disclosed in a preferred embodiment of the present disclosure includes a testing module, a vacuum module, a temperature control module, and an external FTIR spectrometer.

The testing module is configured to create a test environment and establish test conditions for volatilization of a to-be-tested sample 9, and includes a testing cabin 5, a replaceable standard testing lens 2, and a stage 3. The testing cabin 5 provides basic frame support for the entire real-time spectrum testing device for a volatile condensable material in a wide temperature range.

The vacuum module includes a vacuum inner cavity 8 and a vacuum system 4. The vacuum inner cavity 8 is installed in the testing cabin 5 in a thermally insulated manner. A cabin wall of the testing cabin 5 is provided with a vacuum system interface. By means of the vacuum system interface, the vacuum inner cavity 8 is connected to the vacuum system 4 located outside the testing cabin 5. The vacuum system 4 vacuumizes the interior of the vacuum inner cavity 8 by using a molecular pump or an ion pump, so as to achieve the purpose of simulating a vacuum environment of outer space. Under the control of the vacuum system 4, the vacuum inner cavity 8 has a vacuum degree less than $10^{-4}$ Pa, thus covering various test conditions from $10^{-4}$ Pa in a low earth orbit to $10^{-11}$ Pa in a geosynchronous orbit. The stage 3 and the standard testing lens 2 are both installed inside the vacuum inner cavity 8. The standard testing lens 2 is vertically installed in the vacuum inner cavity 8, while the stage 3 is horizontally placed in the vacuum inner cavity 8.

The temperature control module includes a refrigeration system 7 and a temperature control system 6. The refrigeration system 7 is connected to the standard testing lens 2 by means of a refrigeration system interface installed on the cabin wall of the testing cabin 5, and is configured to cool the standard testing lens 2. A Stirling refrigerator or a pulse tube refrigerator is adopted as the refrigeration system 7, with a temperature regulation range of 20° C. to −196° C. The temperature control system 6 is connected to the stage 3 by means of a temperature control system interface installed on the cabin wall of the testing cabin 5, and is configured to heat the stage 3. The temperature control system includes a heating sheet and a temperature measuring resistor. The temperature measuring resistor collects a temperature of the stage 3 and feeds the temperature back to the heating sheet, so as to adjust the temperature of the stage 3 within a range of 20° C. to 200° C.

Two circular infrared perspective windows 1 are symmetrically arranged on two opposite side walls of the testing cabin 5. A circle center of each of the infrared perspective windows 1 is as high as a light port of the external FTIR spectrometer, and also as high as a geometric center of the standard testing lens 2, so that it is ensured that light passing through the two infrared perspective windows 1 at the same time also pass through the standard testing lens 2. An infrared optical material used for the infrared perspective windows 1 is zinc selenide (ZnSe), indium sulfide (InS), gallium arsenide (GaAs), or cadmium sulfide (CdS). In this embodiment, zinc selenide (ZnSe) is adopted as the infrared optical material.

The external FTIR spectrometer is configured to test infrared spectral characteristics of a volatile condensable material on the standard testing lens 2, and incident infrared rays enter through the infrared perspective window 1 on one side of the testing cabin 5, sequentially pass through the standard testing lens 2 and the infrared perspective window 1 on the other side of the testing cabin 5, and enter the light port of the FTIR spectrometer. The FTIR spectrometer obtains a spectral test result of the to-be-tested sample 9 condensed on the standard testing lens 2.

Figure 4:
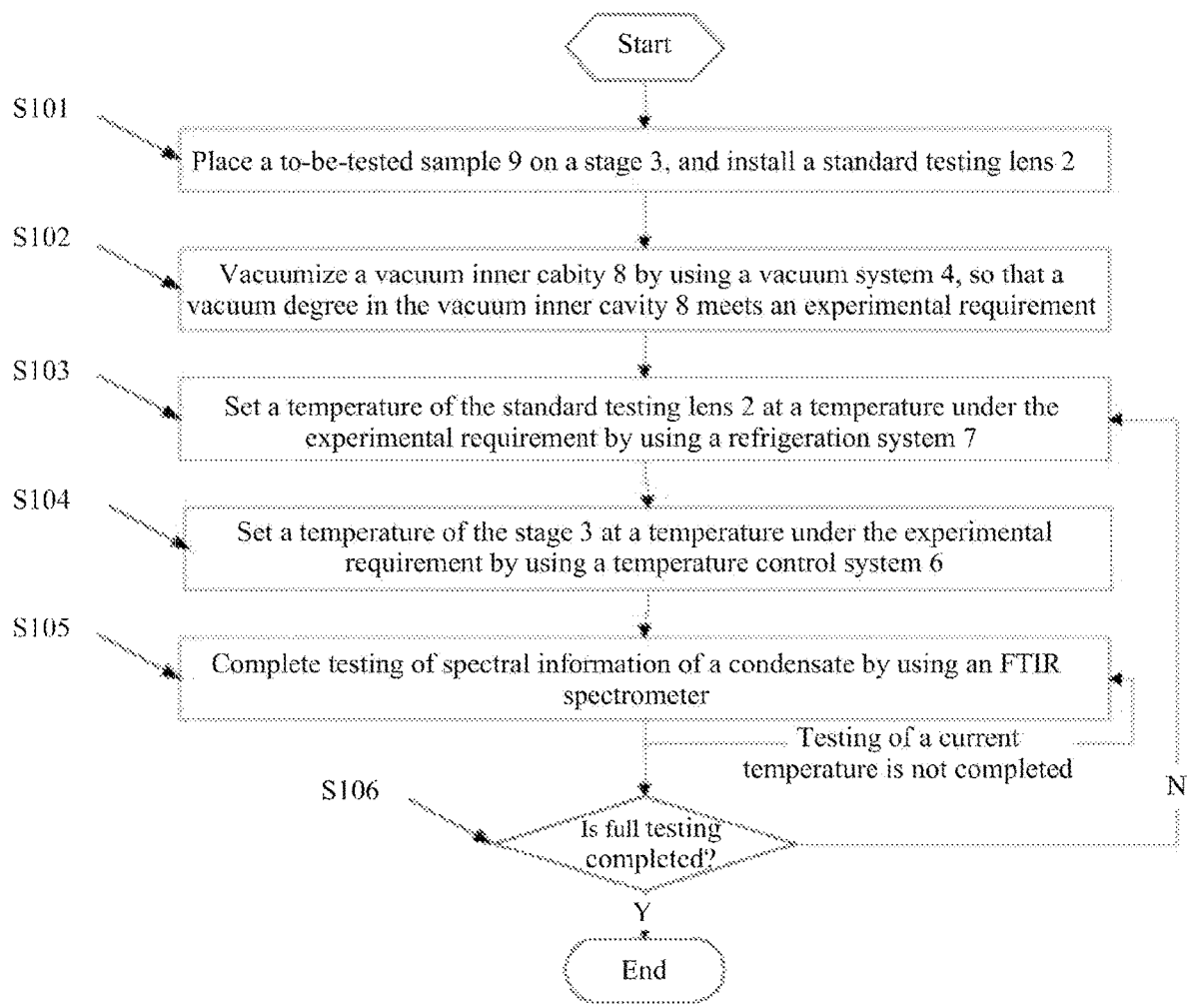
FIG. 4 is a spectrum testing method by using the real-time spectrum testing device for a volatile condensable material in a wide temperature range.

Referring to FIGS. 1 and 4, the present disclosure further discloses a spectrum testing method by using the real-time spectrum testing device for a volatile condensable material in a wide temperature range in the above preferred embodiment, including the following steps.

Step S101: Place a to-be-tested sample 9 on the stage 3, and install the standard testing lens 2.

The to-be-tested sample 9 is a solid, a liquid, or a colloid. The to-be-tested sample 9 is directly placed on the stage 3 when being a solid, or the to-be-tested sample 9 is applied to the stage 3 when being a liquid or a colloid.

Step S102: Vacuumize the vacuum inner cavity 8 by using the vacuum system 4, so that the vacuum degree in the vacuum inner cavity 8 meets an experimental requirement, and is at least $10^{-4}$ Pa.

Step S103: Set a temperature of the standard testing lens 2 at a temperature under the experimental requirement by using the refrigeration system 7. The experimental temperature is 20° C. to −196° C., and is, for example, −123° C.

Step S104: Set the temperature of the stage 3 at a temperature under the experimental requirement by using the temperature control system 6. The experimental temperature is 20° C. to 200° C. and is, for example, 160° C.

Step S105: Cause emitted infrared rays of the FTIR spectrometer to enter through the infrared perspective window 1 on one side of the testing cabin 3, pass through the standard testing lens 2 and the infrared perspective window 1 on the other side, and be received by the light port of the FTIR spectrometer, so as to complete testing of spectral information of a condensate on the standard testing lens 2.

If a test time is less than a volatilization and condensation time corresponding to a current temperature (for example, 160° C.), skip to step S105 to continue to test the spectral information, otherwise proceed to step S106. The test time shall be longer than a time of condensation of volatile matter of the to-be-tested sample 9 on the standard testing lens.

S106: Complete the testing and exit if the testing in all temperature ranges is completed, otherwise proceed to step S103 to set a new experimental temperature for testing.

The above are merely the preferred embodiments of the present disclosure and do not constitute a limitation on the patent scope of the present disclosure. Any equivalent structure or equivalent process change made by using the description and the accompanying drawings of the present disclosure, which is directly or indirectly applied in other related technical fields, should similarly fall within the protection scope of the patent of the present disclosure.

What is claimed is:

1. A real-time spectrum testing device for a volatile condensable material in a wide temperature range, comprising a testing module, a vacuum module, a temperature control module, and a Fourier Transform Infrared Spectroscopy (FTIR) spectrometer, wherein the testing module comprises a testing cabin, a replaceable standard testing lens, and a stage; the vacuum module comprises a vacuum inner cavity and a vacuum system; the vacuum inner cavity is installed in the testing cabin in a thermally insulated manner, and is connected to the vacuum system outside the testing cabin by means of a vacuum system interface installed on a cabin wall of the testing cabin; the stage is horizontally installed in the vacuum inner cavity; and the standard testing lens is vertically installed in the vacuum inner cavity;

the temperature control module comprises a refrigeration system and a temperature control system; the refrigeration system is connected to the standard testing lens by means of a refrigeration system interface installed on the cabin wall of the testing cabin; and the temperature control system is connected to the stage by means of a temperature control system interface installed on the cabin wall of the testing cabin;

the FTIR spectrometer is configured to test infrared spectral characteristics of a volatile condensable material on the standard testing lens to obtain a spectral test result; and two infrared perspective windows are further symmetrically installed on two opposite side walls of the testing cabin; a geometric center of each of the infrared perspective windows is as high as a light port of the FTIR spectrometer, and a height of the standard testing lens is adjusted, so that light passing through the two infrared perspective windows at the same time also pass through the standard testing lens.

2. The real-time spectrum testing device for a volatile condensable material in a wide temperature range according to claim 1, wherein an infrared optical material used for the infrared perspective windows is zinc selenide, indium sulfide, gallium arsenide, or cadmium sulfide.

3. The real-time spectrum testing device for a volatile condensable material in a wide temperature range according to claim 1, wherein the temperature control system comprises a heating sheet and a temperature measuring resistor; and the temperature measuring resistor collects a temperature of the stage and feeds the temperature back to the heating sheet to adjust the temperature of the stage.

4. The real-time spectrum testing device for a volatile condensable material in a wide temperature range according to claim 3, wherein a temperature adjustment range of the temperature control system is 20° C. to 200° C.

5. The real-time spectrum testing device for a volatile condensable material in a wide temperature range according to claim 1, wherein the vacuum system vacuumizes the vacuum inner cavity by using a molecular pump or an ion pump.

6. The real-time spectrum testing device for a volatile condensable material in a wide temperature range according to claim 5, wherein the vacuum inner cavity has a vacuum degree less than $10^{-4}$ Pa.

7. The real-time spectrum testing device for a volatile condensable material in a wide temperature range according to claim 1, wherein a Stirling refrigerator or a pulse tube refrigerator is adopted as the refrigeration system.

8. The real-time spectrum testing device for a volatile condensable material in a wide temperature range according to claim 7, wherein a temperature adjustment range of the refrigeration system is 20° C. to −196° C.

9. A spectrum testing method by using the real-time spectrum testing device for a volatile condensable material in a wide temperature range according to claim 1, comprising the following steps:

step S101: placing a to-be-tested sample on the stage, and installing the standard testing lens;

step S102: vacuumizing the vacuum inner cavity by using the vacuum system, so that the vacuum degree in the vacuum inner cavity meets an experimental requirement;

step S103: setting a temperature of the standard testing lens at a temperature under the experimental requirement by using the refrigeration system;

step S104: setting the temperature of the stage at a temperature under the experimental requirement by using the temperature control system;

step S105: causing emitted infrared rays of the FTIR spectrometer to enter through the infrared perspective window on one side of the testing cabin, pass through the standard testing lens and the infrared perspective window on the other side, and be received by the light port of the FTIR spectrometer, so as to complete testing of spectral information of a condensate on the standard testing lens; and if a test time is less than a volatilization and condensation time corresponding to a current temperature, skipping to step S105, otherwise proceeding to step S106; and S106: completing the testing and exiting if the testing in all temperature ranges is completed, otherwise proceeding to step S103 to set a new experimental temperature for testing.

10. The spectrum testing method by using the real-time spectrum testing device for a volatile condensable material in a wide temperature range according to claim 9, wherein the to-be-tested sample is a solid, a liquid, or a colloid; and the to-be-tested sample is directly placed on the stage when being a solid, or the to-be-tested sample is applied to the stage when being a liquid or a colloid.

\* \* \* \* \*